United States Patent [19]

Ritter et al.

[11] 4,076,982

[45] Feb. 28, 1978

[54] AUTOMATIC SAMPLE-CHANGER FOR MASS SPECTROMETERS

[75] Inventors: Hans-Peter Ritter, Cologne; Rainer Strewinsky, Leverkusen; Hans-Dieter Bulwien, Leverkusen; Engelbert Koch, Leverkusen; Hermann Bartholl, Leverkusen; Walter Hupp, Leverkusen, all of Germany

[73] Assignee: Bayer Aktiengesellschaft, Leverkusen, Germany

[21] Appl. No.: 729,929

[22] Filed: Oct. 6, 1976

[30] Foreign Application Priority Data

Oct. 31, 1975 Germany ............................ 2548891

[51] Int. Cl.[2] ............................................ B01D 59/44

[52] U.S. Cl. .................................... 250/288; 250/289

[58] Field of Search ............................... 250/288, 289

[56] References Cited

U.S. PATENT DOCUMENTS

| | | | |
|---|---|---|---|
| 3,117,223 | 1/1964 | Brunnee | 250/288 |
| 3,590,243 | 7/1971 | Perrin | 250/288 |

*Primary Examiner*—Harold A. Dixon

*Attorney, Agent, or Firm*—Burgess, Dinklage & Sprung

[57] ABSTRACT

The sample crucibles inserted in a slide rod are introduced, through a high vaccum lock, into the ion source of a mass spectrometer. The slide rod, together with its drive, is mounted on a lock carriage which runs parallel to the direction of travel of the slide rod. The lock carriage has a separate drive and carries, on the end face which points towards the mass spectrometer, a stuffing box for the vacuum-tight passage of the slide rod. On the rear wall of the high vacuum lock is mounted an O-ring seal, which, with the lock carriage moved in, seals the remaining space between the rear wall of the lock and the end face of the lock carriage, in the region of the slide rod. The sample crucibles can be taken out selectively from the sample magazine, which can slide at right angles to the slide rod, by means of the holder mounted at the end of the slide rod.

10 Claims, 11 Drawing Figures

AUTOMATIC SAMPLE-CHANGER FOR MASS SPECTROMETERS

Figure 1A:
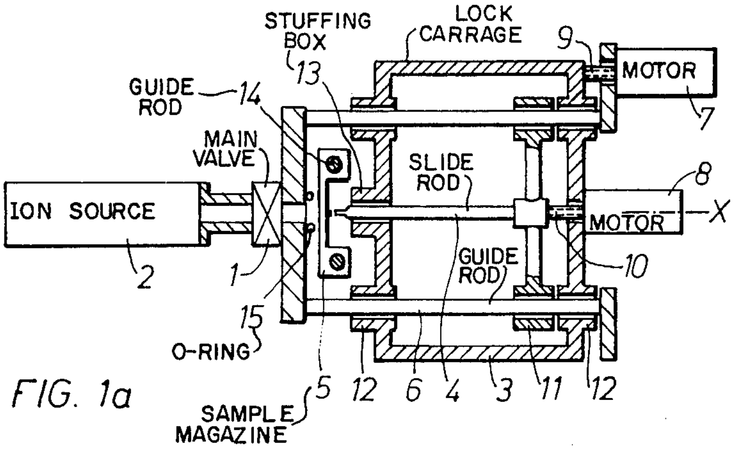

The invention relates to an automatic sample changer for mass spectrometers with a vaporising device for solid and liquid samples. The sample changer may ensure that up to 30 sample crucibles can be inserted successively into the holder of a slide rod, and again be removed. The same to be vaporised is introduced, by means of the slide rod, into the mass spectrometer through a high vacuum lock.

Within the last few years, mass spectrometry has become a routine tool of the organic chemist. A principal field of use of mass spectrometry is to clarify the structure of organic compounds. The mass spectrometers required for this purpose are very expensive instruments and also continuously entail high operating costs. It is therefore desirable to use such expensive instruments, with the aid of data processing installations, in automatic operation for more than eight hours per day. Mass spectrometers are commercially available (for example type CH 5 from Messrs. Varian MAT), which in principle are suitable for this purpose. With this tupe of mass spectrometer, the sample is introduced by means of a push rod which can be heated and cooled and which is introduced through a high vacuum lock into the ion source of the mass spectrometer. The sample to be vaporised is in a crucible which is located at the front end of the slide rod. The vaporisation process in the mass spectrometer is regulated so that the total ion stream generated in the ion source is constant with time. This regulating is an essential prerequisite for mass spectrometers which operate automatically.

An essential disadvantage of these mass spectrometers is that the sample crucibles must be introduced manually into the slide rod. This prevents fully automatic operation.

The invention has now set itself the objective of developing an automatic sample changer for mass spectrometers of the type described at the outset, in order to permit fully automatic analyses whilst at the same time using data processing installations. In detail, this presents the following requirements:

a. the operating reliability must be so high that the mass spectrometer can also continue to run at night, without supervision, and b. the sample changer must be of such construction that it can be attached, without excessive effort, to the sample-introducing part of a mass spectrometer.

According to the invention, a. the slide rod of the sample changer, including its drive, is mounted on a lock carriage which runs parallel to the slide rod, and which has a separate drive and possesses, at its end face which points towards the mass spectrometer, a stuffing box for the vacuum-tight passage of the slide rod, b. an O-ring seal is mounted on the rear wall of the high vacuum lock and, with the lock carriage moved in, seals the space remaining between the rear wall of the lock and the end face of the lock carriage in the region of the slide rod, and c. a sample magazine, which can slide at right angles to the slide rod, is fitted between the end face of the lock carriage and the rear wall of the high vacuum lock, and the sample crucibles can be taken selectively from the magazine by means of a holder mounted at the end of the slide rod.

It is advantageous if the slide rod and the lock carriage are mounted on common guide rods.

In a further development of the invention, the sample magazine is provided with a fork for removing the crucibles from the sample holder and the crucibles have an annular groove corresponding to the aperture of the fork.

In the further improvement, the sample magazine is surrounded by a covering hood and is under a protective gas. This protects the samples from moisture and decomposition.

Stepping motors have proved suitable drives for the sample magazine and also for the slide rod. Very exact positioning can be achieved therewith.

The sample changer construction according to the invention ensures the requisite high precision in introducing the samples into the mass spectrometer. On the other hand, the compact construction relatively easily permits attachment to already existing mass spectrometers. An important advantage is, furthermore, the fact that the attachment of the sample changer presents no problems as regards the high vacuum seal.

Using the new sample changer, it has for the first time proved possible to carry out routine analyses in night operation, without the presence of operators.

An example of an embodiment of the invention is explained in more detail in the text which follows, with the aid of drawings.

In the drawings

Figure 1B:
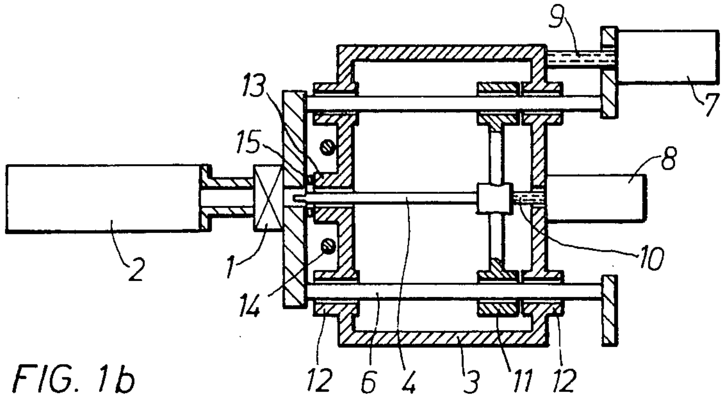
Figure 1C:
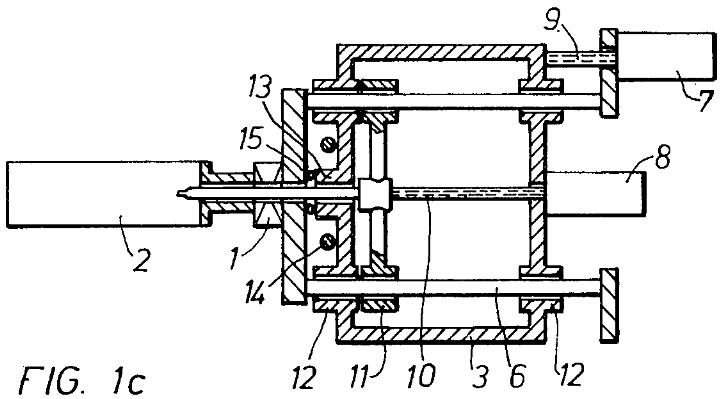
Figure 2A:
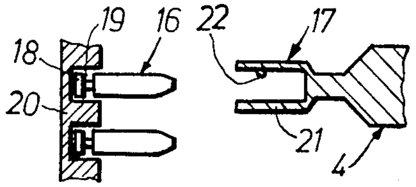
Figure 2B:
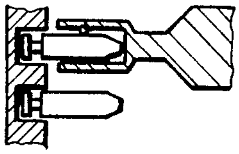
Figure 2C:
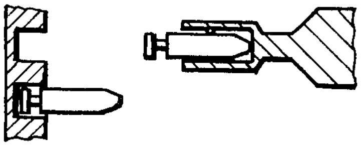
Figure 3A:
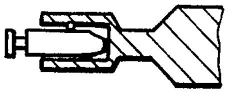
Figure 3B:
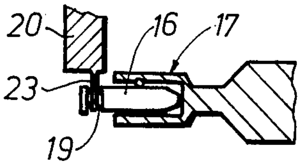
Figure 3C:
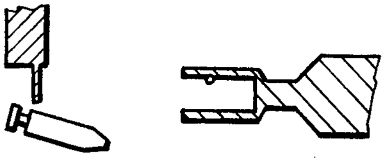
Figure 4:
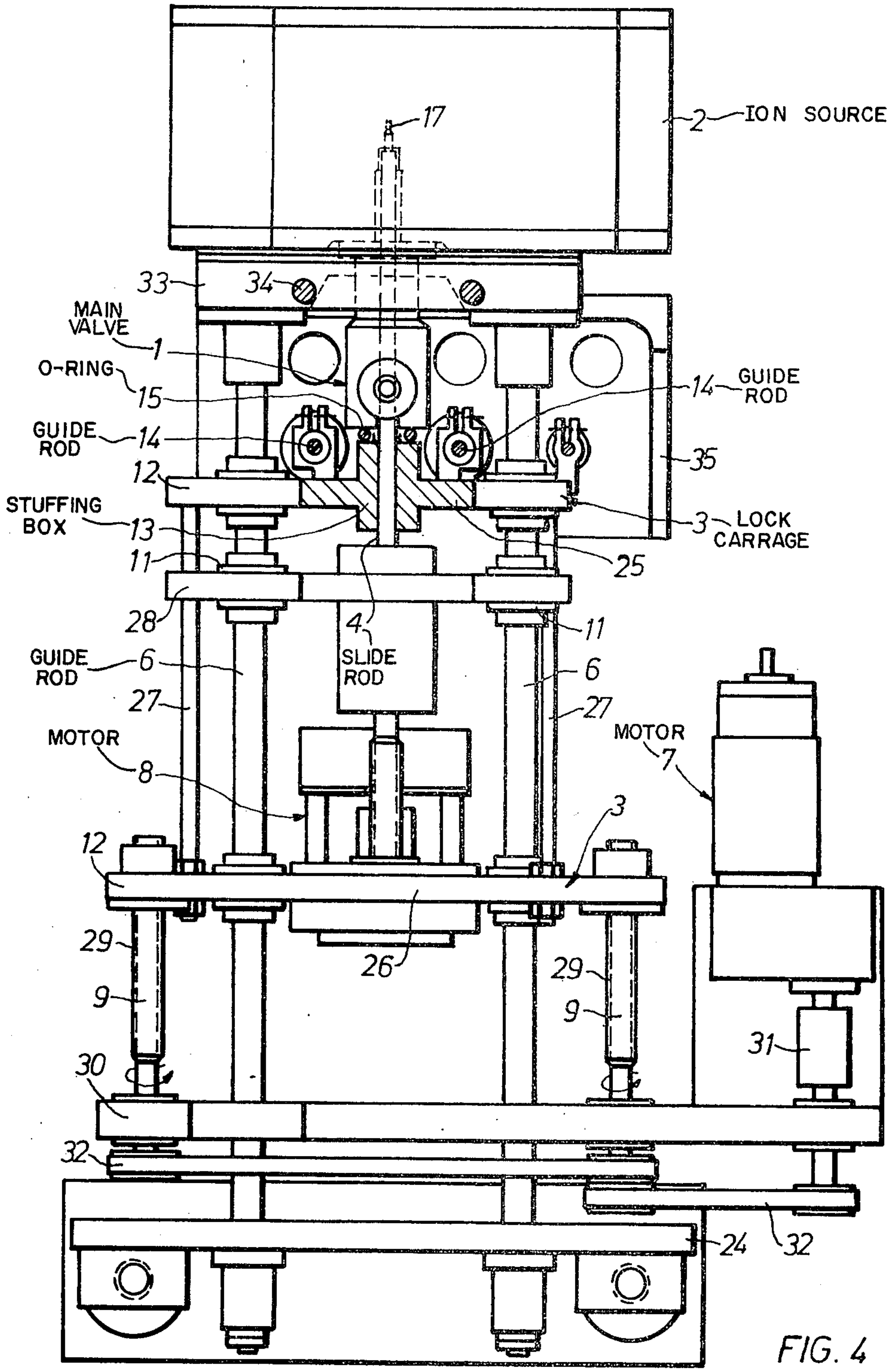
Figure 5:
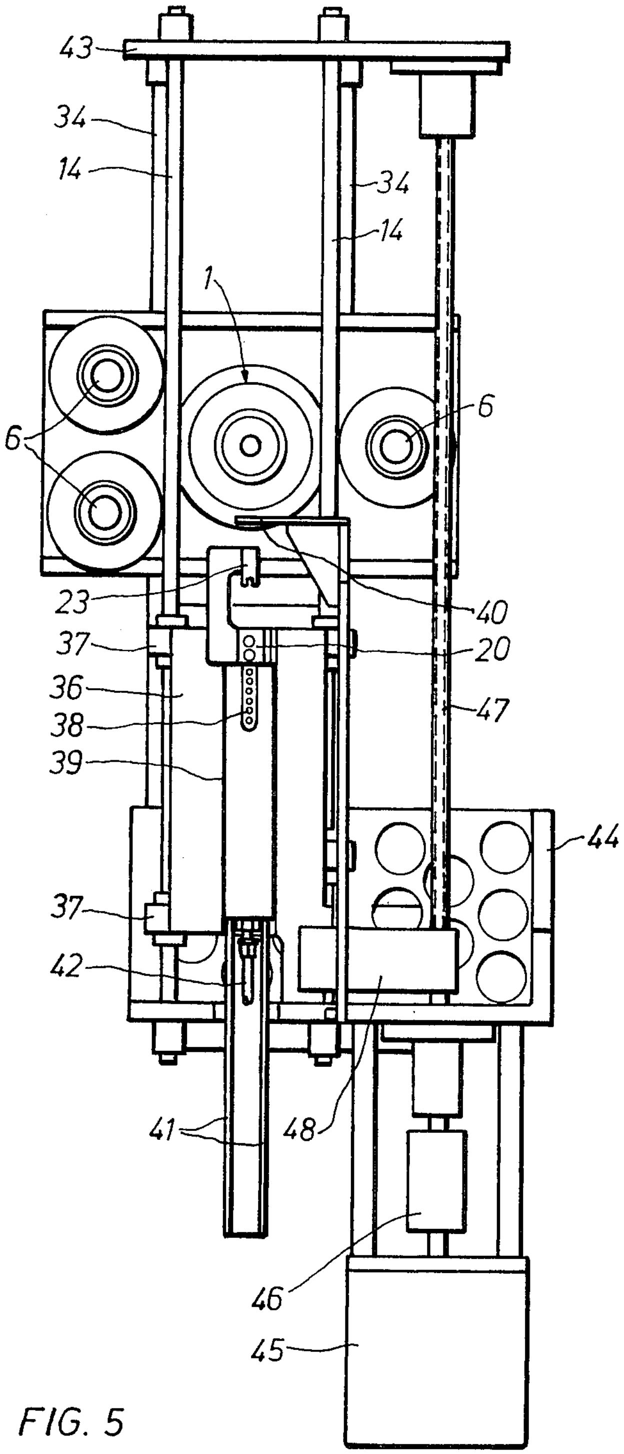

FIGS. 1*a*–1*c* show the mode of operation and the schematic construction partly in section of the sample changer, viewed from above, FIGS. 2*a*–2*c* show how the sample crucible is taken over by the slide rod, FIGS. 3*a*–3*c* show the removal of the sample crucible, FIG. 4 shows the construction of the sample changer in plan view (lock cartridge and slide rod) and FIG. 5 shows the construction of the sample changer in side view (sample magazine).

SAMPLE CHANGER MECHANISM (PRINCIPLE)

The principle of the same changer mechanism will first be explained with the aid of FIGS. 1*a*–1*c*. The sample changer is inserted, via a main valve 1 which is high vacuum-tight, into the ion source 2 of a 90° sector field mass spectrometer. The essential elements of the sample changer are the lock carriage 3, the slide rod 4 and the sample magazine 5. The lock carrage 3 and the slide rod 4 are mounted on three guide rods 6 so that they can travel in the direction of the X-axis (as shown). Here and when mentioned hereinafter the X-axis corresponds with the longitudinal axis of the slide rod 4. The movement is effected by means of spindles 9 and 10 driven by the motors 7 and 8. It is of essential importance for the functioning of the sample changer that the lock carriage 3 and the slide rod 4 should have drives which are separately controllable. The slide rod drive 8 is mounted on the rear wall of the lock carriage 3. The bearing of the lock carriage 3 and of the slide rod 4 on the common guide rods 6 is provided by the slide-bushes 11 and 12.

A stuffing box 13 for providing a high vacuum-tight passage for the slide rod 4 is mounted on the end face of the lock carriage 3 which faces the mass spectrometer. The crucible holder is at the left-hand end of the slide rod 4 (as shown, see FIG. 2*a*).

The sample magazine can be introduced from below into the space between the rear of the high vacuum lock 1 and the end face of the lock carriage 3. For this purpose, the sample magazine 5 is mounted, so that it can slide vertically, on guide rods 14 which are set up at right angles to the plane of the drawing. With the sample magazine 5 moved out, the lock carriage 3 can be made to travel sufficiently far in the direction towards the high vacuum lock 1 that the end face of the stuffing box 13 rests against the O-ring seal 15. As a result, the space between the end face of the stuffing box 13 inside the O-ring is sealed and can be evacuated, via conduits not shown. This fundamentally avoids the high vacuum lock 1 being in connection with the atmosphere.

AUTOMATIC SEIZING OF THE CRUCIBLE

The shape of the sample crucibles 16 and their holder 17 at the end of the slide rod can be seen from FIGS. 2*a* to 3*c*. The crucibles consist of a cylindrical vessel with a lid 18 at their top end. An annular groove 19 is milled into the lid 18. Furthermore, the lid has a central bore of size approx. 0.1 mm, for vaporisation of the sample. The crucible bottom tapers conically. This shape facilitates insertion into the crucible holder 17. The crucibles 16 are inserted with their head in bores in a sample magazine plate 20, the bores being arranged along a straight line. The sample magazine plate can slide at right angles to the slide rod 4 (X-axis). The mechanics required for this are described later. The crucible holder 17 consists of a cylinder 21 with a clamping spring 22.

FIGS. 2*a* to 2*c* show the individual steps of the seizing of the crucible. For seizing, the crucible 16 is brought into alignment with the X-axis (FIG. 2*a*). The slide rod 4 then moves towards the magazine plate 20, firmly clamps the crucible 16 in the holder 17 (FIG. 2*b*) and during the subsequent retraction movement into its starting position draws the crucible out of the hole bored in the magazine plate 20 (FIG. 2*c*).

After vaporisation of the sample in the mass spectrometer, the sample crucible 16 must be removed from the holder 17 so that the holder can be charged with the next crucible. The removal of the sample crucible 16 from the holder 17 is shown schematically in FIGS. 3*a* to 3*c*. According to FIG. 3*a*, the crucible, with the vaporised sample, has again been moved out of the mass spectrometer and is in the positon of the magazine plate 20. In this position, a holding fork 23 mounted on the magazine plate 20 is now brought into engagement with the annular groove 19 of the sample crucible 16 (see FIG. 3*b*). the slide rod 4 is then moved back into its initial position. As a result, the crucible 16 is drawn out of the crucible holder 17 and falls into a container (which is not shown in the drawing)(see FIG. 3*c*).

DESCRIPTION OF MODE OF OPERATION

The working sequence of the fully automatic mass spectrometer can be made clear by the following flow chart:

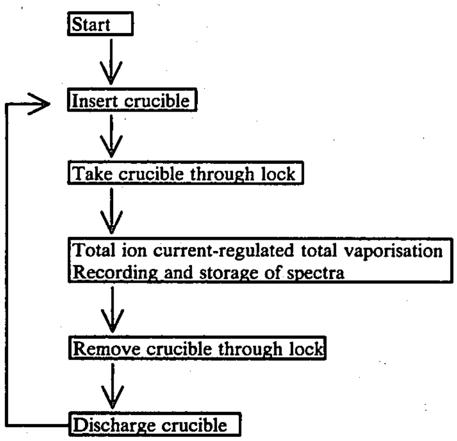

In the starting position according to FIG. 1*a*, the sample crucible 16 is inserted into the slide rod 4 in the manner just described. For this purpose, the sample magazine 5 is pushed upwards in a vertical direction until the crucible containing the desired sample coincides with the X-axis, that is to say with the slide rod, so that crucible 16 can be inserted into slide rod 4 and removed from the magazine. Therafter, the sample magazine 5 is again moved out in a downward direction. This frees the path for the lock carriage 3 (FIG. 1*b*). The latter now closes the lock by advancing up to the O-ring seal 15. The remaining axial space between the stuffing box 13 and the rear wall of the lock is then evacuated by means of a pre-vacuum pump. Thereafter, the high vacuum lock 1 can be opened. The slide rod drive 8 is then put into operation and the slide rod 4, with the sample to be investigated, passes through the high vacuum lock 1 into the ion source 2 of the mass spectrometer. The sample crucible 16 is now in the measuring positon (see FIG. 1*c*). In this position, the vaporising device is switched on. During the time that the sample is being vaporised, mass spectra are recorded at regular intervals, and are stored.

After completion of the vaporisation, the crucible 16 is again withdrawn from the mass spectrometer. For this purpose, the slide rod with the crucible is retracted to behind the high vacuum lock. The high vacuum lock 1 is then closed again. Thereafter the crucible 16 is removed, as already described, by means of the holder fork 23 mounted on the sample magazine 5. The lock carriage 3 moves back into the initial position (see FIG. 1*a*).

CONSTRUCTION OF THE SAMPLE CHANGER (SEE FIGS. 4 AND 5)

The sample changer consists essentially of two parts, that is to say the lock carriage 3 with the slide rod 4 and the corresponding guide mechanics (see FIG. 4) and the sample magazine 5 with guide mechanics (see FIG. 5). The lock carriage 3 is borne by means of the slide bushes 12 on the three guide rods 6 which run parallel to the X-axis. The slide bushes 12 are provided, on their inside, with ball bearings (so-called ball bushes). This achieves precise and easy-running guiding. The guide rods 6 are bolted to a baseplate 24.

The end face 25 and the rear wall 26 of the lock carrige 3 are held together by the connecting rods 27. The slide rod 4 is borne, on the one hand, in the guideplate 28 and, on the other, together with its drive 8, in the rear wall 26 of the lock carriage 3. The guideplate 28, like the lock carriage 3, is borne on the guide rods 6 by means of ball bushes. The drive 8 for the slide rod 4 consists of a stepping motor which drives a clasp nut. As a result of the rotation of the clasp nut, the spindle 10 connected to the slide rod 4 (see FIG. *1a*) is moved forwards or backwards. The lock carriage 3 is driven via the spindles 9, which rotate relative to the clasp nuts 29. The clasp nuts 29 are fixed on the rear wall 26 of the lock carriage 23. The drive 7 and the bearing for the spindles 9 are mounted on a baseplate. The drive 7 consists of a D.C. motor which drives the spindles 9 via a gearbox 31 and a toothed belt 32. The two drives 7 and 8 are controlled separately. The construction of the "slide rod 4 which is suspended in the lock carriage 3" ensures that the slide rod 4 necessarily also executes every movement of the lock carriage 3. Conversely, the lock carriage 3 remains at rest when the slide rod is caused to move by the drive 8.

The end face 25 of the lock carriage 3 is provided with a Teflon stuffing box 13. It serves to provide a high vacuum-tight passage for the slide rod 4. With the lock carriage moved in (see FIG. *1b*) the end face of the stuffing box 13 rests, via the O-ring seal 15 against the rear wall of the high vacuum lock 1. The axial space enclosed thereby can be evacuated by means of a low vacuum pump. A safety circuit ensures that the high vacuum lock 1 can only be opened when this space has been evacuated down to the pre-vacuum. This prevents the high vacuum lock 1 being in connection with the atmosphere on its inlet side.

The mechanical connection of the sample changer with the mass spectrometer 2 is provided by the flange 33. The guide rods 6 are also borne in this flange. The flange 33 furthermore carries holding rods 34, pointing upwards and downwards, on which are mounted baseplates 35 for the sample magazine 5. As already described, the sample magazine 5 can slide upwards at right angles to the slide rod 4 (that is to say at right angles to the plane of the drawing). For this purpose, guide rods 14 are provided at right angles to the slide rod. The sample magazine 5 is mounted in such a way that the sample crucibles, in the region of the X-axis, are conveyed into the space immediately adjoining the high vacuum lock 1. In this space, the sample crucibles are taken over by the crucible holder 17 mounted at the end of the slide rod, as described in FIG. 2.

The guide mechanics for the sample magazine 5, including its drive, will be explained with the aid of FIG. 5. The entire system is mchanically joined to the sample changer via the holding rods 34. FIG. 5 also shows the relative position of the three guide rods 6 for the lock carriage and the high vacuum lock 1. Similarly to the lock carriage 3, the sample magazine 5 also consists of a carriage 36, which is borne on the guide rods 14 by means of the ball bushes 37, in such a way as to enable it to slide. The actual magazine plate 20 with bore holes 38 is fixed to the carriage 36. The crucibles 16 are inserted, with their head end, into the bore holes 38. The bore holes 38 are located vertically below one another. The crucibles 16 in the magazine plate 20 are covered with a hood. As the crucibles are moved into the sample changer, this hood is held back by the strap 40. The hood 39 slides, by its side edges, in the grooves 41. The fact that the magazine plate 20 is covered enables the sample crucibles 20 to be flushed with a protective gas. This prevents the samples coming into contact with the atmosphere and possibly being damaged, during the waiting time. The protective gas, for example nitrogen, is supplied through the nozzle 42.

The holding fork 23 for removing the sample crucibles 16 off after the measurement sequence (see description of FIG. 3) is firmly joined to the magazine plate 20.

The guide rods 14 for the sample carriage 36 are anchored in two baseplates 35. The drive is effected by means of a stepping motor 45 via a gearbox 46 which is joined to the spindle 47. The rotation of the spindle brings about a vertical shift of the clasp nut 48, which in turn is joined to the sample carriage 36. All functions of the sample changer are controlled and monitored by a digital control system. This control system also ensures correct interlocking of the functions of the mass spectrometer (scan and vaporisation of the sample) and of the data processing installation connected thereto. The data processing installation serves in the main to receive and store the spectra and subsequently to evaluate the data. Of course, the sample changer can also be operated manually. Instruments CH 5 and CH 7 of Messrs. Varian MAT were used as mass spectrometers. In a typical overnight measuring session, about 30 samples with about 1,000 spectra can be measured, and of these, after working up, about 50 spectra are evaluated. This means a considerable increase in the measuring capacity.

What we claim is:

1. An automatic sample changer for a mass spectrometer having a vapourising device and a lock region, the changer comprising: a slide rod movable into and out of the vapourising device, a crucible holder mounted on one end of the slide rod and adapted to hold a crucible for the sample to be vapourised for insertion by the slide rod into the mass spectrometer; high vacuum lock means including a lock carriage in which the slide rod is mounted and which is capable of independent parallel movement relative to the slide rod, a stuffing box disposed on the end face of the lock carriage directed towards the mass spectrometer for effecting the vacuum tight passage of the slide rod and means for sealing the space between the end face of the lock carriage, the stuffing box and the lock region of the mass spectrometer when the lock carriage has moved into contact with that lock region, and a sample magazine adapted to move relative to the slide rod to allow sample crucibles to be taken selectively from the magazine by the crucible holder.

2. An automatic sample changer for a mass spectrometer according to claim 1, wherein the lock region comprises a rear wall and further comprising a drive for the slide rod which is mounted on the lock carriage which runs parallel to the slide rod, and a separate drive for the lock carriage, an O-ring seal which is mounted on the rear wall of the high vacuum lock region and, with the lock carriage moved in, act as the means for sealing the space remaining between the lock rear wall and the end face of the lock carriage in the region of the slide rod, and wherein the sample magazine can slide at right angles with respect to the slide rod, is fitted between the end face of the lock carriage and the rear wall, and includes means from which the sample crucibles can be taken selectively by means of the holder attached to the end of the slide rod.

3. An automatic sample changer for a mass spectrometer, according to claim 2, in which the slide rod and the lock carraige have common guide rods for guiding the parallel movment of the slide rod and lock carriage.

4. An automatic sample changer for a mass spectrometer, according to claim 3, in which the sample magazine is provided with a fork for removing the crucibles from the sample holder and the crucibles have an annular groove adapted to be engaged by an aperture of the fork.

5. An automatic sample changer for a mass spectrometer, according to claim 3, in which the drive for the sample magazine and/or for the slide rod comprises a stepping motor.

6. An automatic sample changer for a mass spectrometer, according to claim 2, in which the sample magazine is provided with a fork for removing the crucibles from the sample holder and the crucibles have an annular groove adapted to be engaged by an aperture of the fork.

7. An automatic sample changer for a mass spectrometer, according to claim 6, in which the drive for the sample magazine and/or for the slide rod comprises a stepping motor.

8. An automatic sample changer for a mass spectrometer, according to 2, in which the sample magazine is enclosed by a covering hood and is under a protective gas.

9. An automatic sample changer for a mass spectrometer, according to claim 8, in which the drive for the sample magazine and/or for the slide rod comprises a stepping motor.

10. An automatic sample changer for a mass spectrometer, according to claim 2, in which the drive for the sample magazine and/or for the slide rod comprises a stepping motor.

* * * * *